US007701977B2

(12) United States Patent
Saghi et al.

(10) Patent No.: US 7,701,977 B2
(45) Date of Patent: Apr. 20, 2010

(54) METHOD AND APPARATUS TO ALIGN AND STANDARDIZE PACKET BASED PARALLEL INTERFACES

(75) Inventors: Eugene Saghi, Colorado Springs, CO (US); Richard L. Solomon, Colorado Springs, CO (US); Robert E. Ward, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 174 days.

(21) Appl. No.: 12/082,380

(22) Filed: Apr. 10, 2008

(65) Prior Publication Data

US 2009/0257451 A1  Oct. 15, 2009

(51) Int. Cl.
*H04J 3/00* (2006.01)

(52) U.S. Cl. ..................... 370/476; 370/464
(58) Field of Classification Search .............. 370/476, 370/474, 428, 464

See application file for complete search history.

(56) References Cited

U.S. PATENT DOCUMENTS

| 5,608,734 | A  | * | 3/1997  | Sandler et al. ........... 370/509 |
| 6,792,003 | B1 | * | 9/2004  | Potluri et al. ........... 370/476 |
| 6,813,734 | B1 | * | 11/2004 | Bhardwaj ................ 714/48  |
| 6,965,606 | B2 | * | 11/2005 | Bhardwaj ................ 370/428 |
| 7,319,702 | B2 | * | 1/2008  | Moll et al. .............. 370/476 |
| 7,424,036 | B1 | * | 9/2008  | Alexander et al. ........ 370/474 |
| 7,551,645 | B2 | * | 6/2009  | Gulati et al. ............ 370/474 |
| 2003/0123389 | A1 | * | 7/2003  | Russell et al. ........... 370/230 |
| 2004/0001486 | A1 | * | 1/2004  | Ozguner ................. 370/389 |
| 2006/0072619 | A1 | * | 4/2006  | Geer ..................... 370/476 |
| 2008/0175072 | A1 | * | 7/2008  | Norman .................. 365/189.05 |

\* cited by examiner

*Primary Examiner*—Chi H Pham
*Assistant Examiner*—Robert Lopata
(74) *Attorney, Agent, or Firm*—Suiter Swantz pc llo

(57) ABSTRACT

A packet alignment system for pre-processing/aligning incoming packets may comprise one or more registers for receiving control signals and data signals. An aligner may cyclically shift said data signals to form a plurality of shifted data words. A plurality of pipe registers may collect and generate an adjusted control signal for each one of the plurality of shifted data words. A filtering logic may identify one of the plurality of shifted data words as a desired aligned data word. The filter logic may also be configured for registering header data, payload data and ECRC data contained in the desired aligned data word in a header register, a payload register and an ECRC register, respectively. An output interface may generate an outgoing signal and provide data from at least one of the header register, the payload register and the ECRC register.

20 Claims, 2 Drawing Sheets

METHOD AND APPARATUS TO ALIGN AND STANDARDIZE PACKET BASED PARALLEL INTERFACES

TECHNICAL FIELD

The present disclosure generally relates to the field of data communications, and more particularly to a method/apparatus for aligning and/or standardizing a packet-based communication interface.

BACKGROUND

High-speed serial implementations are frequently utilized for computer internal data communications. Examples include, but are not limited to, PCI Express, Serial Attached SCSI, and Serial ATA. Such serial implementations generally utilize packet-based interfaces. Within the integrated circuits that implement such interfaces, serial bit streams are converted into parallel packet-based data streams (e.g. data bus) in order to reduce internal clock rates to manageable frequencies. As the speeds of such serial interfaces increase, widths of the packet-based data streams may be increased accordingly to keep clock speeds reasonable. In such implementations, it is common for an interface to allow a packet to start with any byte alignment on the data bus. It is also common that packet transmissions are not synchronized with the internal clock, i.e., a packet-based transmission may start and end at any time relative to the internal clock.

SUMMARY

A packet alignment system for pre-processing/aligning incoming packets may comprise one or more registers for receiving control signals and data signals. An aligner may receive the control and data signals from the registers and cyclically shift data signals to form a plurality of shifted data words. A plurality of pipe registers may collect the plurality of shifted data words, and generate an adjusted control signal for each one of the plurality of shifted data words. A filtering logic may identify one of the plurality of shifted data words as a desired aligned data word. The filter logic may also be configured for registering header data contained in the desired aligned data word in a header register, registering payload data contained in the desired aligned data word in a payload register and registering End-to-end Cyclic Redundancy Check (ECRC) data contained in the desired aligned data word in an ECRC register. An output interface may generate an outgoing signal and provide data from at least one of the header register, the payload register and the ECRC register.

A method for pre-processing/aligning incoming packets may comprise receiving an input signal comprising a control signal and a data signal; supplying the input signal to an aligner to form a plurality of shifted data words; collecting the plurality of shifted data words; generating an adjusted control signal for each one of the plurality of shifted data words; identifying one of the plurality of shifted data words as a desired aligned data word; registering header data contained in the desired aligned data word in a header register; registering payload data contained in the desired aligned data word in a payload register; registering ECRC data contained in the desired aligned data word in an ECRC register; and generating an outgoing signal.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Packet-based data communication interfaces are commonly utilized in high-speed serial implementations. A packet may comprise a formatted block of data including a packet header, an applicable packet payload and an applicable End-to-end Cyclic Redundancy Check (ECRC). In one instance, a packet is built from one or more 32-bit wide data words. However, it is contemplated that other data word sizes may be utilized. The transmission of a packet may start and end at any time relative to the internal clock of a computer. In addition, a receiver (a device on the receiving end of a transmission) may receive incoming data at various rates during a transmission. Furthermore, many serial interfaces support operations utilizing a variety of data bus link widths. Therefore, the receiver of the packet may be required to handle all possible alignments of the packet that may occur.

A packet alignment system is capable of adapting to different possible incoming data rates and data bus link widths, and pre-processes/aligns all incoming packets. The received packets are aligned utilizing a pipelined process and presented to the receiver through a standardized output interface, reducing the complexity and process latency of the receiver. The packet alignment system may further comprise an error handling logic to handle packets received with errors. In one specific embodiment, the error handling logic discards a packet when an error is detected. In an alternative embodiment, the error handling logic is configured to perform error checking and relay the error checking information to the receiver. It is contemplated that the packet alignment system may be configured to adapt possible changes in packet-based communication protocols while keeping a standardized output interface intact.

Figure 1:
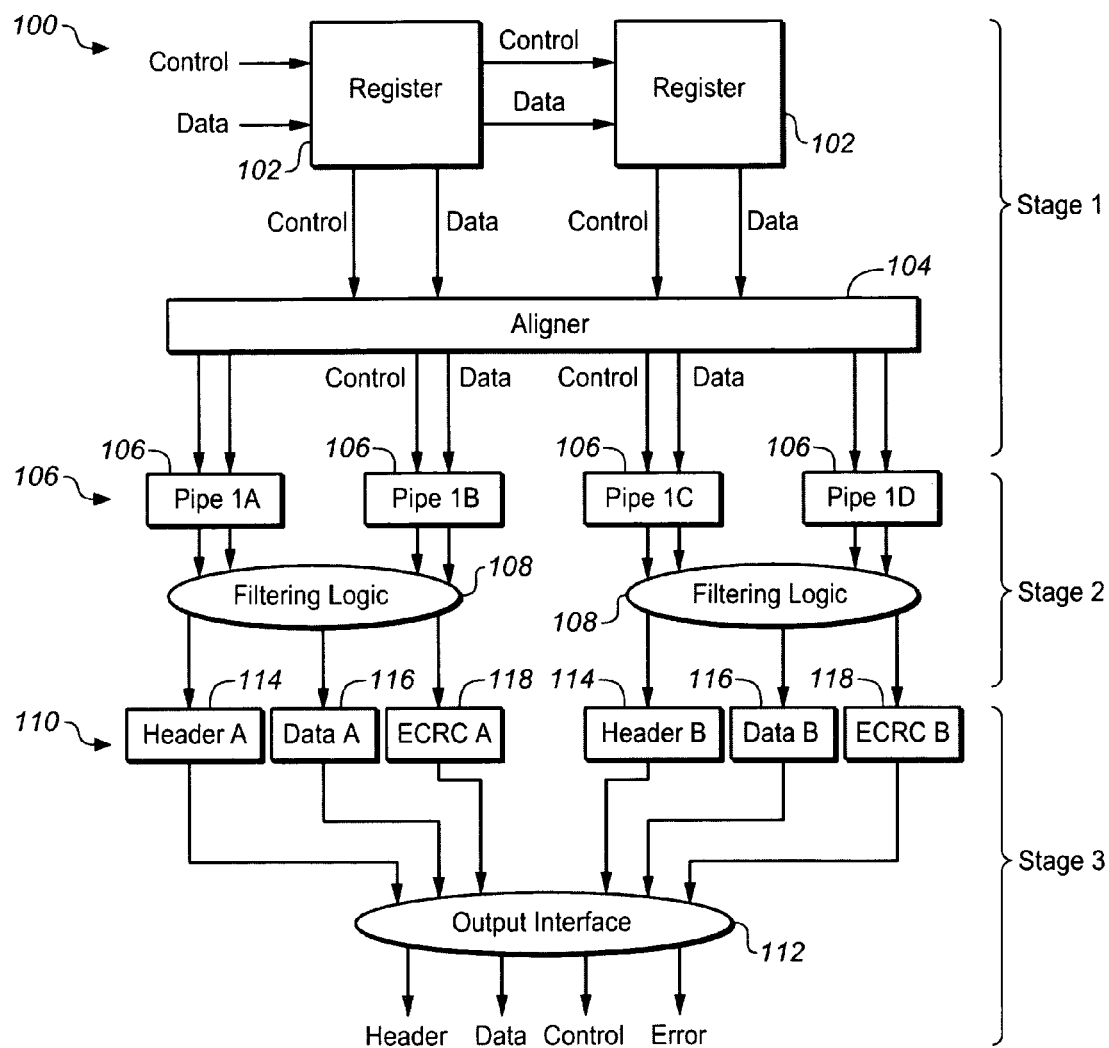
FIG. 1 is a block diagram illustrating a packet alignment system.

A packet alignment system is described herein and set forth in the claims and is depicted in the block diagram of FIG. 1, wherein an exemplary embodiment of a packet alignment system 100 is shown. The packet alignment system 100 utilizes a pipelined structure to reduce the complexity and to increase the efficiency of the system. In a specific embodiment as depicted in FIG. 1, a three-stage pipeline structure is utilized for aligning received data having four possible byte alignments (e.g., a data word of a packet may start at byte lane 0, byte lane 1, byte lane 2, or byte lane 3 of the data bus).

A first stage (Stage 1) of the packet alignment system comprises one or more registers 102 for collecting input signals to be further processed by an aligner 104. An input signal comprises a data signal and a control signal. The data signal contains data of a packet being transmitted (e.g., incoming header data, incoming payload data, and/or incoming ECRC data). The control signal comprises at least one of an SOP position indicating the byte lane of the data bus containing a Start-of-Packet (SOP), an EOP position indicating the byte lane of the data bus containing an End-of-Packet (EOP), one or more data valid bits indicating the byte lanes containing valid incoming data, and an error bit indicating that an error was detected by a preceding layer. It is contemplated that the registers 102 may further comprise an error handling logic. The error handling logic may be configured to automatically reject/discard a short packet (e.g., a one-dataword packet) with an error.

It is understood that not all control signals are required to be present in a clock cycle. For example, transmission of a larger packet may require multiple cycles to complete, in such case the SOP and the EOP position of this particular packet may be specified in different cycles. It is also possible for a cycle to contain both an SOP and an EOP position, in such case the relative positions of the SOP and the EOP may be utilized to determine if the SOP and the EOP refer to the same incoming packet or different incoming packets.

Depending on the data bus link width utilized by the input signal, the registers 102 may collect the incoming data and control signals for more than one clock cycle before sending the data and control signals collected to the aligner 104. The data and control signals are sent to the aligner 104 after sufficient data signals are collected to form a data word of a predetermined size. In a specific embodiment, the data signals are collected to form at least one 32-bit wide data word. The aligner 104 may be configured as a barrel shift aligner to cyclically shift the data word by a predetermined number of bits. In a specific embodiment, the barrel shift aligner 104 cyclically shifts the data word by 8 bits (1 byte) in each shifting operation, producing four different shifted data words for each incoming 32-bit wide data word. Each of the four shifted data words is registered in a pipe register 106. Each of the four pipe registers 106 is configured to generate an adjusted control signal (e.g., SOP, EOP, data valid bits) according to the byte positions in the shifted data word registered in the pipe register 106. One of the pipe registers contains a desired data alignment (aligned data word) of the received data word.

A second stage (Stage 2) of the packet alignment system comprises a filtering logic 108 to identify the desired data alignment among the shifted data words in the pipe registers 106. The desired data alignment may be identified by comparing byte alignments of each of the shifted data words in the pipe registers 106 with preceding data words collected in the packet holding register 110. For example, the pipe register containing the shifted data word with a byte alignment that is aligned to the preceding data word is identified as the desired data alignment.

The desired data alignment identified is registered in one or more packet holding registers 110. In a specific embodiment, the packet holding register 110 includes a header register 114 for collecting aligned header data contained in the desired aligned data word, a payload register 116 for collecting aligned payload data contained in the desired aligned data word, and an ECRC register 118 for collecting ECRC data contained in the desired aligned data word. It is contemplated that the filtering logic 108 may process the shifted data words in parallel. In a specific embodiment utilizing a PCI Express communication interface, the filtering logic 108 is implemented in two parallel paths because the PCI Express packet restrictions and incoming data bus width may not support pipe registers Pipe 1A and Pipe 1B to contain active packets simultaneously (this would also apply to pipe registers Pipe 1C and Pipe 1D).

A third stage (Stage 3) of the packet alignment system includes logic for presenting data words of a packet in the packet holding register 110 to the receiver through a standardized output interface 112. A packet may be ready to be presented when both the SOP and the EOP of the packet are received by the packet holding register 110, and EOP position of the packet is determined based on the combination of header and payload data. In a specific embodiment utilizing two packet holding registers 110 (e.g., in a two parallel paths configuration), the output interface 112 is configured to receive information from both packet holding registers, and determines if either of the packet holding registers contains a packet ready to be presented. It is contemplated that ECRC error checking may be performed in this stage on the combined header and payload data. The alignment system may be configured to automatically discard a packet with a detected ECRC error, or to present the packet to the receiver with an ECRC error signal.

In a specific embodiment, an output signal of the output interface 112 comprises a header signal, a payload signal, and one or more outgoing signals. If the packet contains payload data, the header signal is always aligned and presented in the same cycle as the first data word of the payload data. The payload data is presented such that it is always aligned to start in byte lane 0 of the data bus in each transmitting cycle. The outgoing signals comprise at least one of an SOP present signal indicating that the header signal contains a new packet header and that the payload contains the first word of payload for the packet; an EOP present signal indicating that the packet is complete and that the ECRC error signal and other applicable error signals are valid; an EOP position signal indicating the byte lane of the payload containing the last byte of the transmitting data; and a payload valid signal indicating that a new data word of the payload is present on the payload bus in the current cycle (transmission of a larger packet may require more than one cycle to complete, however not all cycles during the transmission of the packet may contain a data word).

While the preceding example describes four different input alignments for the received data and is implemented in three stages, it is understood that alternative designs of the packet alignment system may be employed without departing from the scope and spirit of the present invention. For example, the number of stages utilized to implement the pipelined structure may vary depending on the width of the input data bus and/or the desired clock speed requirements. Moreover, the number of input alignments may also vary.

Figure 2:
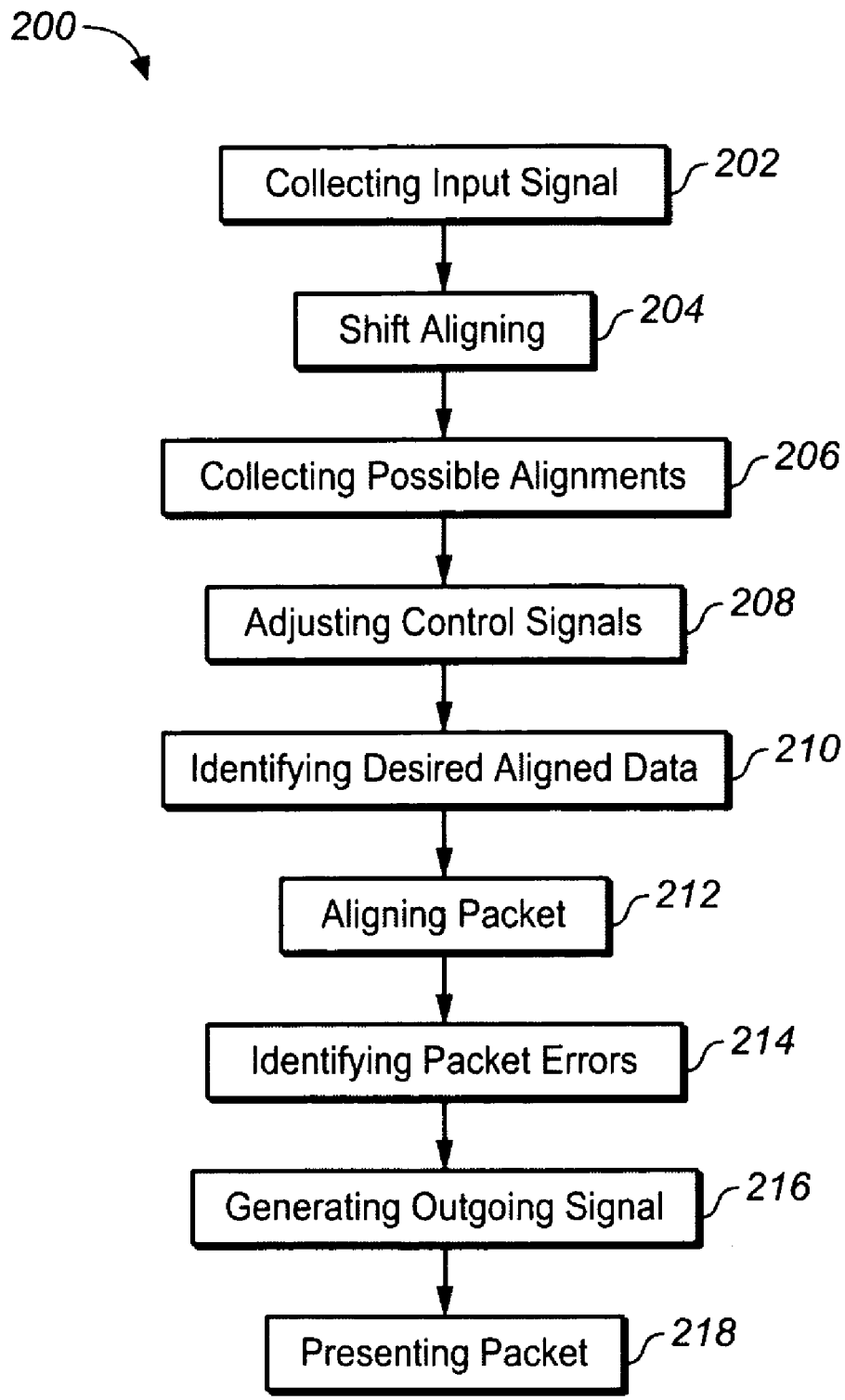
FIG. 2 is a flow diagram illustrating the basic steps performed by a packet alignment method.

FIG. 2 shows a flow diagram illustrating the basic steps performed by a packet alignment method 200 in accordance with the present invention. Step 202 collects input signals comprising data and control signal for one or more cycles to form at least one data word. Step 204 cyclically shifts each data word to form a plurality of shifted data words representing all possible byte alignments that may occur on the data bus. Step 206 collects the shifted data words. Step 208 generates adjusted control signals for each of the shifted data words. Step 210 identifies a desired aligned data word among the shifted data words. Step 212 aligns the desired aligned data with preceding data words of the packet. Step 214 identifies packet errors. Step 216 generates outgoing signals, and step 218 presents the packet and outgoing signals to the receiver.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A packet alignment system, comprising:
   at least one register for receiving an input signal comprising a control signal and a data signal;
   an aligner connected to the at least one register, the aligner configured to receive the input signal from the at least one register when the input signal comprises a data word of a predetermined size and cyclically shift said data word of a predetermined size to form a plurality of shifted data words;
   a plurality of pipe registers for collecting the plurality of shifted data words, each one of said plurality of pipe registers configured to generate an adjusted control signal for each one of said plurality of shifted data words;
   a filtering logic for identifying one of the plurality of shifted data words as a desired aligned data word, and for registering header data contained in the desired aligned data word in a header register, registering payload data contained in the desired aligned data word in a payload register, and registering end-to-end cyclic redundancy check (ECRC) data contained in the desired aligned data word in an ECRC register;
   an output interface for generating an outgoing signal and providing data from at least one of the header register, the payload register and the ECRC register.

2. The packet alignment system of claim 1, wherein the control signal comprises at least one of a Start-of-Packet (SOP) position, an End-of-Packet (EOP) position, a data valid indicator, and an error indicator.

3. The packet alignment system of claim 1, wherein the data signal comprises at least one of an incoming header data, an incoming payload data, and an incoming ECRC data.

4. The packet alignment system of claim 1, wherein the outgoing signal comprises at least one of an SOP present signal, an EOP present signal, an EOP position, a payload valid signal, and an error signal.

5. The packet alignment system of claim 1, wherein the filtering logic further comprises an error handling logic for detecting possible errors in a packet, and wherein erroneous packet data is discarded automatically by the filtering logic.

6. The packet alignment system of claim 1, wherein the filtering logic further comprises an error handling logic for detecting possible errors in a packet, and wherein erroneous packet data is indicated in the outgoing signal.

7. The packet alignment system of claim 1, wherein the aligner is a barrel shift aligner.

8. A packet alignment system, comprising:
   at least one register for receiving an input signal comprising a control signal and a data signal;
   an aligner connected to the at least one register, the aligner configured to receive the input signal from the at least one register when the input signal comprises a data word of a predetermined size and cyclically shift said data word of a predetermined size to form a plurality of shifted data words;
   means for collecting the plurality of shifted data words, the collecting means configured to generate an adjusted control signal for each one of said plurality of shifted data words;
   means for identifying one of the plurality of shifted data words as a desired aligned data word;
   means for registering header data contained in the desired aligned data word in a header register, registering payload data contained in the desired aligned data word in a payload register, and registering end-to-end cyclic redundancy check (ECRC) data contained in the desired aligned data word in an ECRC register; and
   an output interface for generating an outgoing signal and providing data from at least one of the header register, the payload register and the ECRC register.

9. The packet alignment system of claim 8, wherein the control signal comprises at least one of a Start-of-Packet (SOP) position, an End-of-Packet (EOP) position, a data valid indicator, and an error indicator.

10. The packet alignment system of claim 8, wherein the data signal comprises at least one of an incoming header data, an incoming payload data, and an incoming ECRC data.

11. The packet alignment system of claim 8, wherein the outgoing signal comprises at least one of an SOP present signal, an EOP present signal, an EOP position, a payload valid signal, and an error signal.

12. The packet alignment system of claim 8, wherein the aligning means further comprises an error handling logic for detecting possible errors in a packet, and wherein erroneous packet data is discarded automatically by the filtering logic.

13. The packet alignment system of claim 8, wherein the aligning means further comprising an error handling logic for detecting possible errors in a packet, and wherein erroneous packet data is indicated in the outgoing signal.

14. The packet alignment system of claim 8, wherein the aligner is a barrel shift aligner.

15. A packet alignment method, comprising:
    receiving an input signal, the input signal comprising a control signal and a data signal;
    supplying the input signal to an aligner when the input signal comprises a data word of a predetermined size;
    triggering the aligner to cyclically shift said data word of a predetermined size to form a plurality of shifted data words;
    collecting the plurality of shifted data words;
    generating an adjusted control signal for each one of said plurality of shifted data words; identifying one of the plurality of shifted data words as a desired aligned data word;
    registering header data contained in the desired aligned data word in a header register;
    registering payload data contained in the desired aligned data word in a payload register;
    registering end-to-end cyclic redundancy check (ECRC) data contained in the desired aligned data word in an ECRC register; and
    generating an outgoing signal.

16. The packet alignment method of claim 15, wherein the control signal comprises at least one of a Start-of-Packet (SOP) position, an End-of-Packet (EOP) position, a data valid indicator, and an error indicator.

17. The packet alignment method of claim 15, wherein the data signal comprises at least one of an incoming header data, an incoming payload data, and an incoming ECRC data.

18. The packet alignment method of claim 15, wherein the outgoing signal comprises at least one of an SOP present signal, an EOP present signal, an EOP position, a payload valid signal, and an error signal.

19. The packet alignment method of claim 15, further comprising detecting possible errors in a packet, wherein erroneous packet data is discarded automatically.

20. The packet alignment method of claim 15, further comprising detecting possible errors in a packet, wherein erroneous packet data is indicated in the outgoing signal.

* * * * *